(12) United States Patent
Mihara (10) Patent No.: US 11,135,913 B2
(45) Date of Patent: Oct. 5, 2021

(54) FUEL TANK VALVE DEVICE

(71) Applicant: PIOLAX, INC., Yokohama (JP)

(72) Inventor: Kenta Mihara, Yokohama (JP)

(73) Assignee: PIOLAX, INC., Yokohama (JP)

( * ) Notice: Subject to any disclaimer, the term of this patent is extended or adjusted under 35 U.S.C. 154(b) by 107 days.

(21) Appl. No.: 16/492,196

(22) PCT Filed: Mar. 9, 2018

(86) PCT No.: PCT/JP2018/009313
§ 371 (c)(1),
(2) Date: Sep. 9, 2019

(87) PCT Pub. No.: WO2018/168712
PCT Pub. Date: Sep. 20, 2018

(65) Prior Publication Data
US 2021/0138895 A1    May 13, 2021

(30) Foreign Application Priority Data

Mar. 16, 2017  (JP) .............................. JP2017-051107

(51) Int. Cl.
*B60K 15/035*  (2006.01)
*F02M 37/00*  (2006.01)
(Continued)

(52) U.S. Cl.
CPC ....... *B60K 15/03519* (2013.01); *F02M 37/00* (2013.01); *F02M 37/0082* (2013.01);
(Continued)

(58) Field of Classification Search
CPC .... B60K 15/03519; B60K 2015/03289; F02M 37/0082; F02M 37/20; F02M 37/00; F16K 31/22
See application file for complete search history.

(56) References Cited

U.S. PATENT DOCUMENTS 4,781,218 A     11/1988  Mori et al.
6,405,747 B1 *  6/2002   King ................. B60K 15/03519
                                                     137/202
(Continued)

FOREIGN PATENT DOCUMENTS

JP    UM H04-53294 Y2   12/1992
JP       2002-004966 A   1/2002
(Continued)

OTHER PUBLICATIONS

International Search Report (ISR) (PCT Form PCT/ISA/210), in PCT/JP2018/009313, dated Jun. 5, 2018 (English and Japanese versions).
(Continued)

*Primary Examiner* — Jessica Cahill
*Assistant Examiner* — Patrick C Williams
(74) *Attorney, Agent, or Firm* — McGinn I.P. Law Group, PLLC.

(57) ABSTRACT

A valve device includes: a housing having a valve chamber and a ventilation chamber divided by a dividing wall, the dividing wall having an opening, and the housing having a discharge opening formed at a peripheral surface on the ventilation chamber side; a float valve coming into and out of contact with the opening; and a fuel vapor pipe connected with the discharge opening outside the housing. The ventilation chamber is provided with a tubular wall which communicates with the discharge opening and which extends from the discharge opening toward the inside of the ventilation chamber. The tubular wall has a surface on the dividing wall side which is provided with a ventilation hole communicating with the ventilation chamber. An end portion on the extending direction side of the tubular wall is closed.

8 Claims, 10 Drawing Sheets

(51) Int. Cl.
  *B60K 15/03* (2006.01)
  *F02M 37/20* (2006.01)
  *F16K 1/22* (2006.01)
  *F16K 31/22* (2006.01)
(52) U.S. Cl.
  CPC .... *B60K 2015/03289* (2013.01); *F02M 37/20* (2013.01); *F16K 31/22* (2013.01)

(56) References Cited

U.S. PATENT DOCUMENTS

| | | | | |
|---|---|---|---|---|
| 6,708,713 | B1* | 3/2004 | Gericke | B60K 15/03519 137/202 |
| 8,042,564 | B2* | 10/2011 | Ando | B60K 15/03504 137/202 |
| 2001/0054438 | A1 | 12/2001 | Shimamura et al. | |
| 2004/0238034 | A1 | 12/2004 | Suzuki et al. | |
| 2013/0276912 | A1 | 10/2013 | Kaneko et al. | |
| 2016/0091107 | A1 | 3/2016 | Kaneko et al. | |

FOREIGN PATENT DOCUMENTS

| | | |
|---|---|---|
| JP | 2004-353518 A | 12/2004 |
| JP | 2008-247157 A | 10/2008 |
| JP | 2010-143498 A | 7/2010 |
| JP | 2012-071639 A | 4/2012 |
| JP | 2013-203279 A | 10/2013 |
| JP | 2016-068678 A | 5/2016 |

OTHER PUBLICATIONS

Written Opinion of the International Searching Authority (PCT/ISA/237), in PCT/JP2018/009313, dated Jun. 5, 2018 (Japanese version).

(PCT/IPEA/409), in PCT/JP2018/009313 (English and Japanese version) International Preliminary Report on Patentability (PCT/IPEA/409), in PCT/JP2018/009313, dated Jan. 22, 2019.

* cited by examiner

FUEL TANK VALVE DEVICE

TECHNICAL FIELD

The present invention relates to a fuel tank valve device that is attached to a fuel tank of an automobile or the like and used as a fuel outflow prevention valve, a full tank regulation valve, or the like.

BACKGROUND ART

For example, a fuel outflow prevention valve that prevents fuel in an fuel tank from leaking to the outside of the fuel tank when an automobile turns around and inclines, a full tank regulation valve that prevents excessive oil supply in the fuel tank such that a liquid level in the fuel tank does not rise beyond a preset full tank level, and the like, are attached in an automobile fuel tank.

As an example of such type of valve in prior art, Patent Literature 1 describes a fuel cut-off valve, which includes: a bottomed cylindrical lower case, in which a valve chamber is provided; a valve seat portion disposed above the lower case, which includes a valve seat opening portion; and an upper cover disposed above the valve seat portion, in which a ventilation chamber is provided. A valve member is configured to be lifted and lowered in the valve chamber. The valve chamber and the ventilation chamber communicate through the valve seat opening portion. A communication path is provided on the upper cover to communicate a canister disposed outside a fuel tank with the ventilation chamber. The communication path is formed in a pipe shape that is obliquely attached to the upper cover, and extends obliquely downward toward the inside of the ventilation chamber of the upper cover. One downward end portion of the communication path is opened so as to communicate with the ventilation chamber. A vapor ventilation opening is formed on an upper portion side of the lower case.

When fuel is oscillated in the fuel tank, the valve member is lifted to close the valve seat opening portion, thus the fuel is regulated from leaking to the outside of the fuel tank. Fuel vapor in the fuel tank passes through the valve seat opening portion or the ventilation chamber, flows into the communication path from the opened end portion of the communication path and is discharged toward the canister side.

CITATION LIST

Patent Literature

PATENT LITERATURE 1: JP-Y-H4-53294

SUMMARY OF INVENTION

Technical Problem

Although fuel in a fuel tank is always stored in the fuel tank at a predetermined height from a bottom surface of the fuel tank, when a vehicle itself is overturned or rolled over horizontally, the fuel is accumulated on a ceiling surface side of the fuel tank.

In the case of the fuel cut-off valve of Patent Literature 1, for example, the fuel may enter the ventilation chamber of the upper cover from the opening on the upper portion side of the lower case through the valve seat opening portion and accumulate in the ventilation chamber. At this time, since the one end portion of the pipe-shaped communication path is opened, the fuel accumulated in the communication chamber of the upper cover may flow from the one end portion into the communication path and flow out to the canister side via the communication path.

Therefore, an object of the present invention is to provide a fuel tank valve device which can prevent fuel from being discharged to the canister side even when the fuel is accumulated in the ventilation chamber due to overturn and horizontal rollover of the vehicle.

Solution to Problem

In order to achieve the above object, the fuel tank valve device of the present invention includes: a housing, in which a partition wall is provided to partition a valve chamber below and a ventilation chamber above, the partition wall being provided with an opening therein to communicate the valve chamber with the ventilation chamber, and an outlet is formed in a peripheral surface of the housing on the ventilation chamber side; a float valve, which is configured to be lifted and lowered in the valve chamber to become abutted against and separated from the opening; and a fuel vapor pipe, which is connected to the outlet outside the housing. A cylindrical wall is provided in the ventilation chamber, the cylindrical wall communicating with the outlet and extending from the outlet toward the inside of the ventilation chamber. A ventilation hole is provided in a surface of the cylindrical wall on the partition wall side to communicate with the ventilation chamber. An end portion of the cylindrical wall on an extending direction side is closed.

Advantageous Effects of Invention

According to the present invention, since the ventilation chamber is provided with the cylindrical wall which communicates with the outlet and extends from the outlet toward the inner side of the ventilation chamber R, with the end portion of the cylindrical wall closed on the extending direction side, and the ventilation hole is provided on the surface of the cylindrical wall on the partition wall side to communicate with the ventilation chamber, even when the fuel flows into the ventilation chamber from the opening of the partition wall when the valve chamber is located above while the ventilation chamber is located below due to overturn or horizontal rollover of a vehicle, it is still difficult for the fuel to flow into the ventilation hole, and the fuel can be prevented from flowing out to the fuel vapor pipe through the outlet.

DESCRIPTION OF EMBODIMENTS

Hereinafter, an embodiment of a fuel tank valve device according to the present invention will be described with reference to FIGS. 1 to 7. In the following description, "fuel" means liquid fuel (including droplets of fuel), and "fuel vapor" means vaporized fuel.

Figure 1:
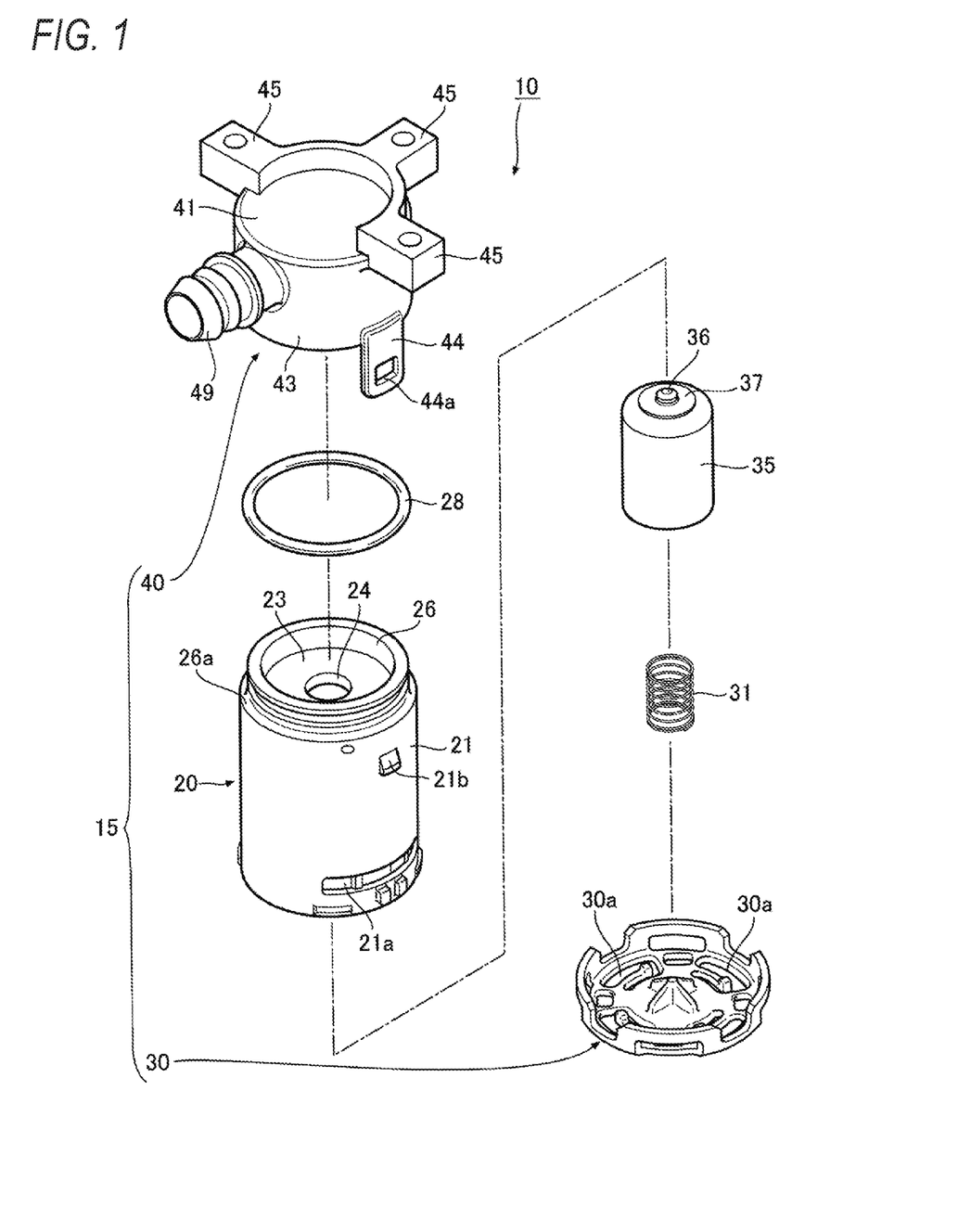
FIG. 1 is an exploded perspective view showing an embodiment of a fuel tank valve device according to the present invention.
Figure 2:
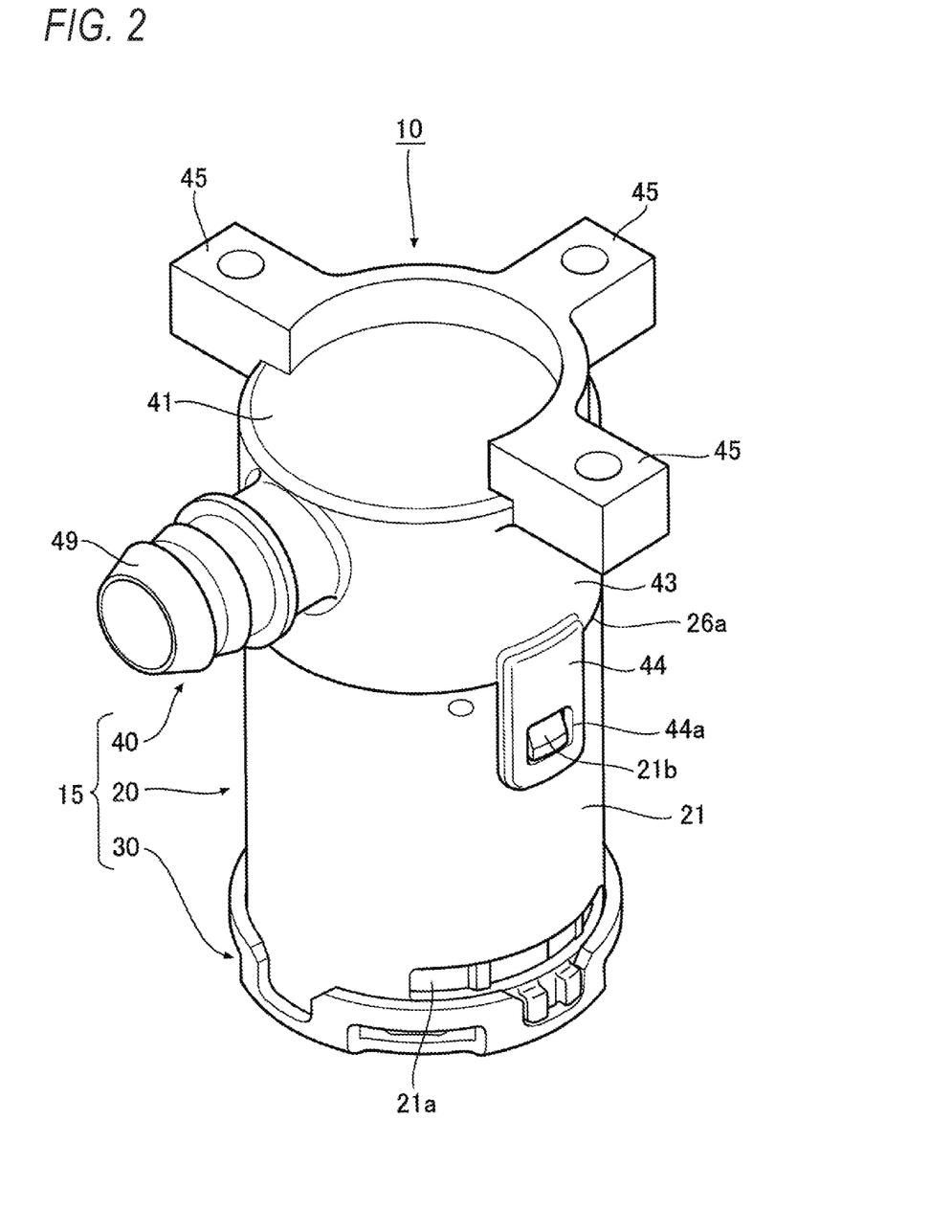
FIG. 2 is a perspective view of the same valve device.

As shown in FIGS. 1 and 2, a fuel tank valve device 10 (hereinafter, referred to as "valve device 10") according to this embodiment includes a housing 15. The housing 15 is configured by: a housing main body 20 which is substantially cylindrical, the housing main body 20 including a partition wall 23 on an upper side thereof; a cap 30 provided below the housing main body 20, the cap 30 including a plurality of ventilation holes 30a; and a cover 40 mounted above the housing main body 20.

Figure 4:
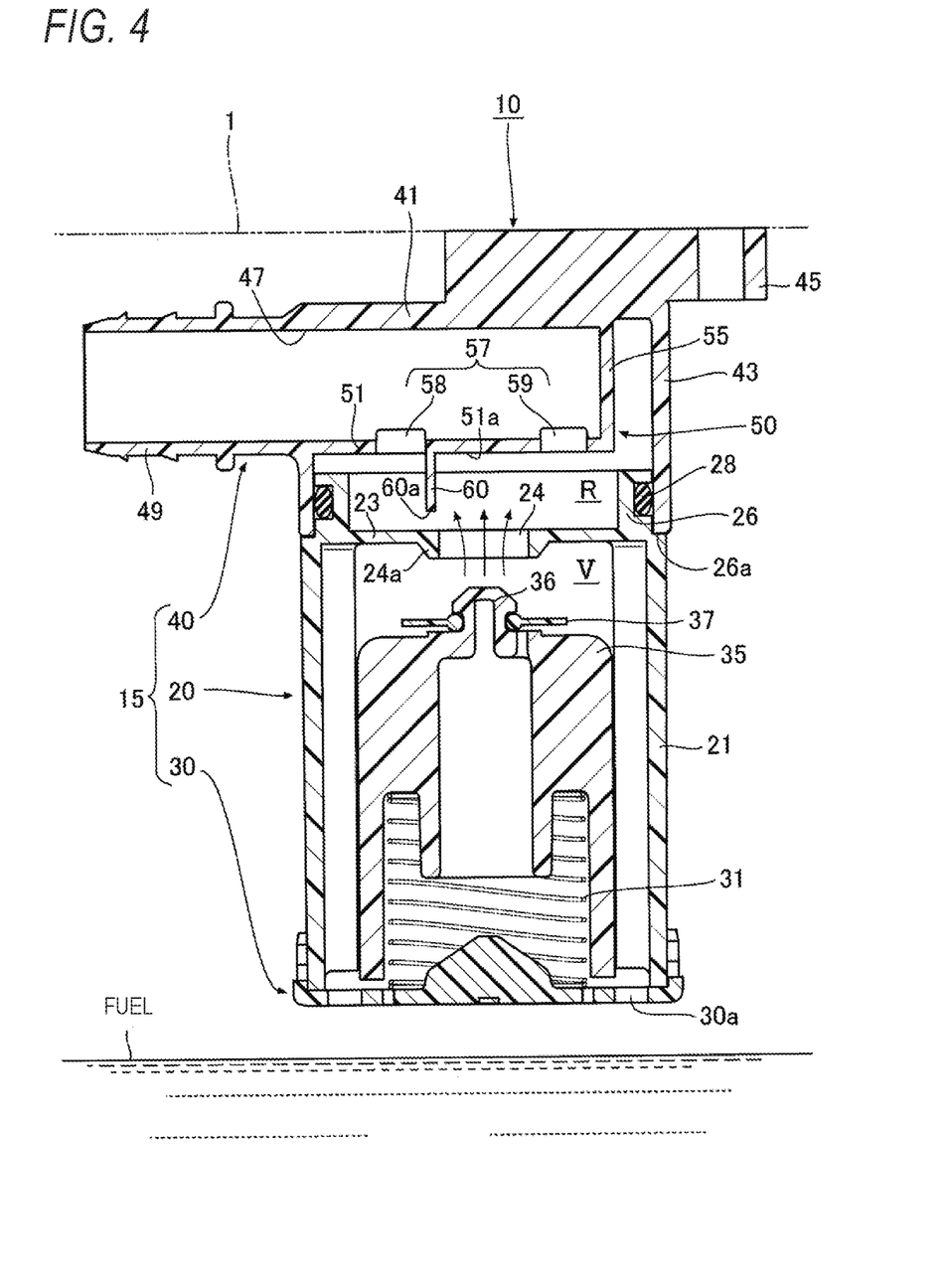
FIG. 4 is a cross-sectional view of the same valve device in a state in which a float valve is lowered to open an opening.

As shown in FIG. 4, the cap 30 is mounted below the housing main body 20, thus a valve chamber V that communicates with a fuel tank (not shown) is formed below the housing by the partition wall 23. The cover 40 is mounted above the housing main body 20, thus a ventilation chamber R that communicates with an outlet 47 is formed above the housing by the partition wall 23.

The housing main body 20 has a substantially cylindrical shape, and a lower side of the housing main body 20 is opened. A peripheral wall 21 in which a ventilation groove 21a is formed on the lower side of the housing main body 20. A locking claw 21b is formed at a position above an outer periphery of the peripheral wall 21. The partition wall 23 is disposed in an upper opening of the peripheral wall 21. A circular opening 24 is formed at a center of the partition wall 23. A valve seat 24a is protruded on an inner peripheral edge of the opening 24 (see FIG. 4). A substantially cylindrical upper wall portion 26 having a diameter smaller than that of the peripheral wall 21 is erected from an upper end side of the peripheral wall 21 via a step portion 26a, and a seal ring 28 is mounted on an outer periphery of the upper wall portion 26.

A float valve 35 is disposed in the valve chamber V in a manner that allows the float valve 35 to be lifted and lowered by a spring 31 between the cap 30. A valve head 36 is protruded from a center of an upper end of the float valve 35, and an annular seal member 37 which is formed of an elastic member such as rubber is mounted on an outer periphery of the valve head 36.

Figure 5:
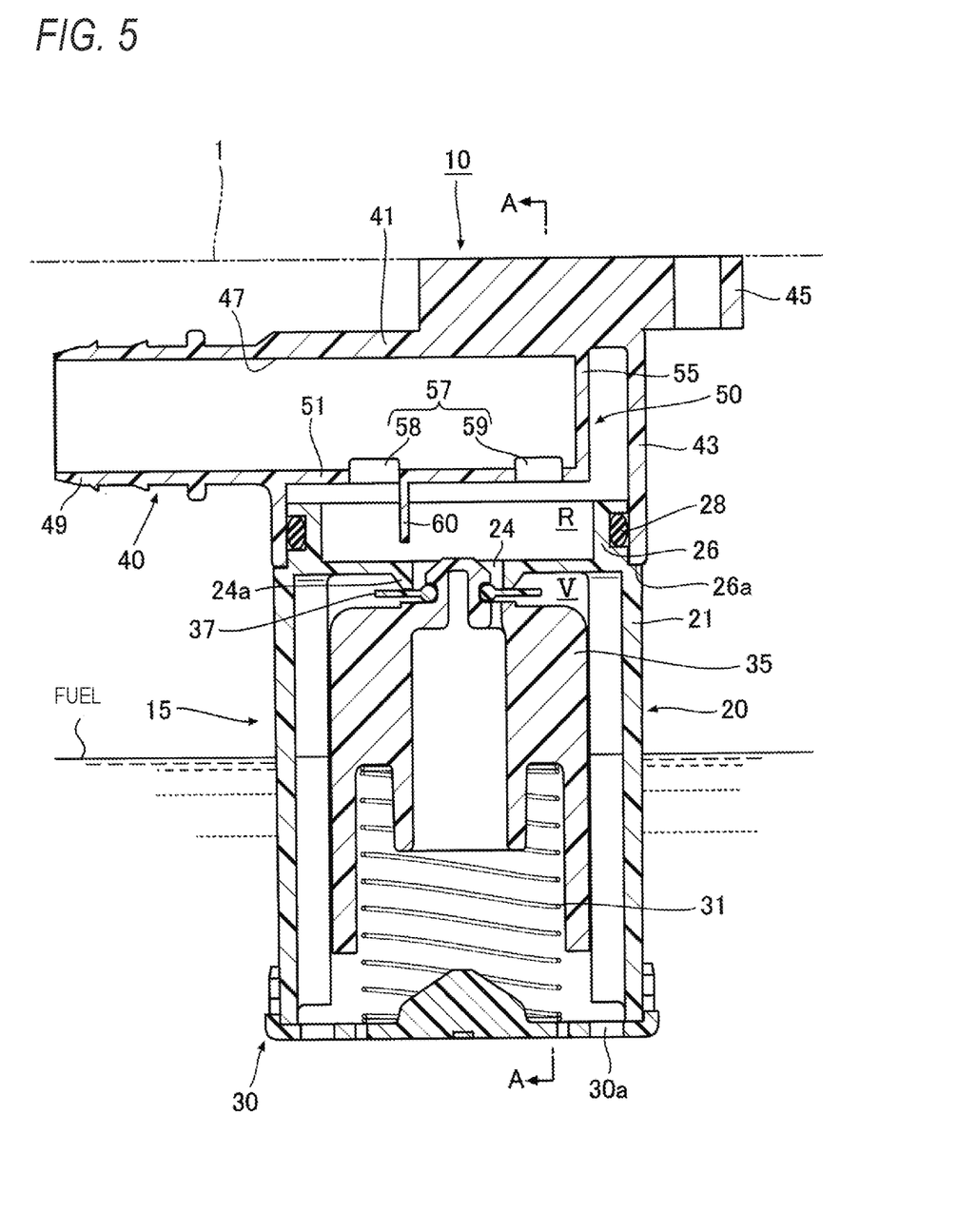
FIG. 5 is a cross-sectional view of the same valve device in a state in which the float valve is lifted to close the opening.

As shown in FIG. 4, in a state in which the float valve 35 is not immersed in fuel, the spring 31 is compressed by an own weight, and is placed on the cap 30. The seal member 37 is separated from the valve seat 24a, thus the opening 24 is kept in an opened state. Meanwhile, when a liquid level of the fuel in the fuel tank rises, the float valve 35 is immersed in the fuel, as shown in FIG. 5, the float valve 35 is lifted due to an urging force of the spring 31 and buoyancy of the float valve 35 itself, thus the seal member 37 is abutted against the valve seat 24a to close the opening 24 of the partition wall 23.

Use of the float valve 35 is not particularly limited, and the float valve 35 may be used as a so-called fuel outflow prevention valve that is lifted to close the opening 24 of the partition wall 23 when the liquid level in the fuel tank abnormally rises due to fuel oscillation or the like, so as to prevent the fuel from leaking to the outside, or may be used as a so-called full tank regulation valve that is lifted to close the opening 24 of the partition wall 23 when the liquid level in the fuel tank reaches a set full tank liquid level, so as to prevent excessive fuel supply beyond the set full tank liquid level.

Next, the cover 40 will be described. As shown in FIG. 1, the cover 40 of this embodiment includes a disk-shaped ceiling wall 41 and a cylindrical peripheral wall 43 extending downward from an outer peripheral edge of the ceiling wall 41. A band-shaped locking piece 44 which is provided with a locking hole 44a is suspended from an outer periphery of a lower end portion side of the peripheral wall 43.

As shown in FIGS. 2 and 4, the lower end portion of the peripheral wall 43 is abutted against the step portion 26a of the housing main body 20, while the locking claw 21b of the housing main body 20 is engaged with the locking hole 44a of the locking piece 44, thus the cover 40 is mounted above the housing main body 20 in a state in which a gap between an inner periphery of the lower end portion of the peripheral wall 43 and the outer periphery of the upper wall portion 26 is hermetically sealed by the seal ring 28.

A plurality of attachment portions 45 protruding outward from the peripheral wall are provided on an outer periphery of an upper side of the peripheral wall 43. The valve device 1 is attached to an inner surface of a ceiling plate of a fuel tank 1 through these attachment portions 45 by means of welding or the like (see FIG. 4). Shapes and structures of the attachment portions are not particularly limited.

An outlet 47 is formed in a peripheral surface of the valve device 10 on the side of the ventilation chamber R of the housing 15 (see FIG. 4). Here, as shown in FIG. 4, the outlet 47 having a circular shape is formed at a predetermined position of the peripheral wall 43. The outlet 47 communicates with the ventilation chamber R.

The valve device 10 includes a fuel vapor pipe 49 which is connected to the outlet 47 outside the housing 15. As shown in FIG. 4, the fuel vapor pipe 49 in this embodiment extends from an outer (outside the ventilation chamber R) peripheral edge of the outlet 47 toward the outside of the housing so as to form a substantially cylindrical shape. The fuel vapor pipe 49 is orthogonal to an axial direction of the float valve 35 and extends parallel to the ceiling wall 41. A tube, which communicates with a canister (not shown) disposed outside the fuel tank, is mounted on an outer periphery of the fuel vapor pipe 49.

Figure 3:
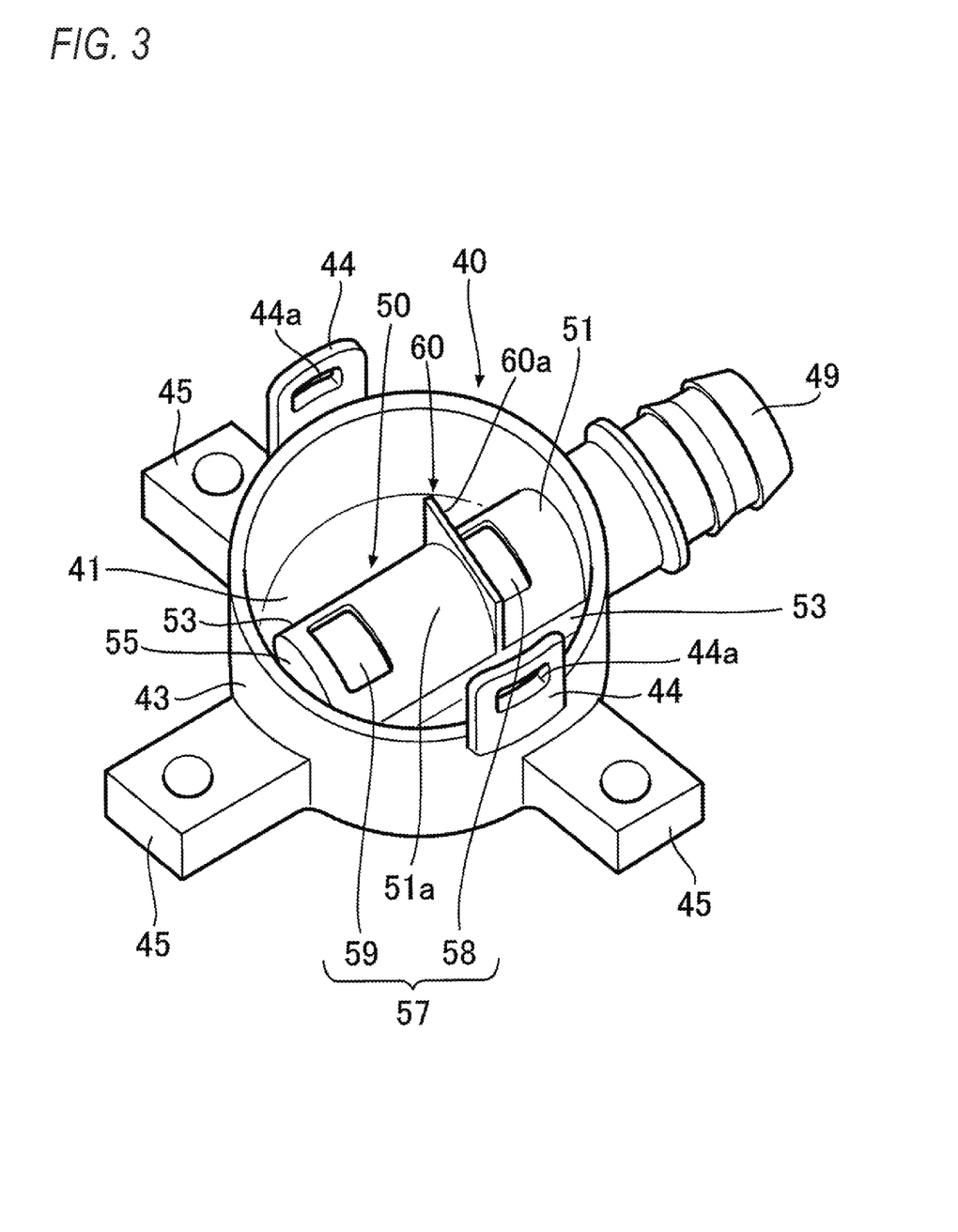
FIG. 3 is a perspective view of a cover constituting the same valve device.

As shown in FIGS. 3 and 4, a cylindrical wall 50, which communicates with the outlet 47 and extends from the outlet 47 toward the inside of the ventilation chamber R, is provided in the ventilation chamber R. Ventilation holes 57 are provided in a surface of the cylindrical wall 50 on the partition wall 23 side to communicate with the ventilation chamber R. An end portion 55 of the cylindrical wall 50 on an extending direction side is closed.

Figure 6:
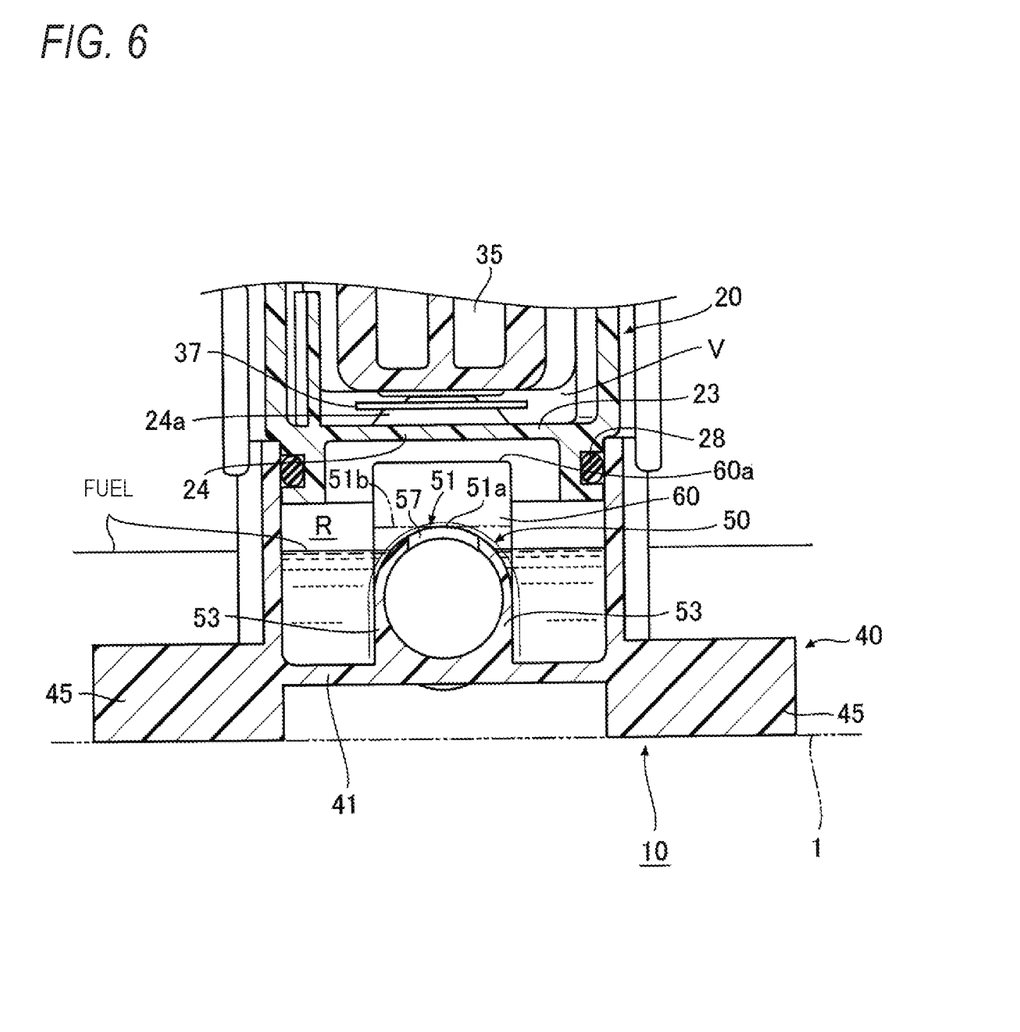
FIG. 6 is an enlarged cross-sectional view of a main part taken along Line A-A of FIG. 5 in a state in which a vehicle is overturned from the state shown in FIG. 5.

As shown in FIG. 3, the cylindrical wall 50 in this embodiment extends from an inner (inside the ventilation chamber R) peripheral edge of the outlet 47 toward the inside of the ventilation chamber R and forms a substantially semi-cylindrical shape. As shown in FIG. 6, the cylindrical wall 50 includes two side portions 53, 53 extending from two sides of a surface of the cylindrical wall 50 on the partition wall 23 side perpendicularly away from the partition wall 23.

More specifically, the cylindrical wall 50 of this embodiment includes: a bottom portion 51, whose outer surface (a surface opposite to an internal space of the cylindrical wall 50) side faces to the partition wall 23, the bottom portion 51 extending in a manner that forms a substantially arc shape cross section; two side portions 53, 53, which extend perpendicularly from two width direction (which means a direction orthogonal to the extending direction of the cylindrical wall 50, the same applies hereafter) sides of the bottom portion 51 in a direction away from the partition wall 23; and an end portion 55 which closes the bottom portion 51 and extending direction tip end portions of the two side portions 53, 53. The two side portions 53, 53 extend perpendicularly toward the ceiling wall 41 from the two end portions of the bottom portion 51 on the two sides in the width direction, and are connected to an inner surface of the same ceiling wall 41 (see FIGS. 3 and 6).

The extending direction tip end portions of the two side portions 53, 53 of the cylindrical wall 50 may not be connected to the ceiling wall 41, and there may be a gap between the two side portions 53, 53 and the ceiling wall 41. In this case, the end portions of the two side portions 53, 53 are connected to another connecting wall. For example, the two side portions 53, 53 may be tapered wall portions that gradually become wider from the two sides of the bottom portion 51 toward the ceiling wall 41 side, or stepped wall portions, or may be formed as a whole in an arc shape, and are not particularly limited.

Figure 7:
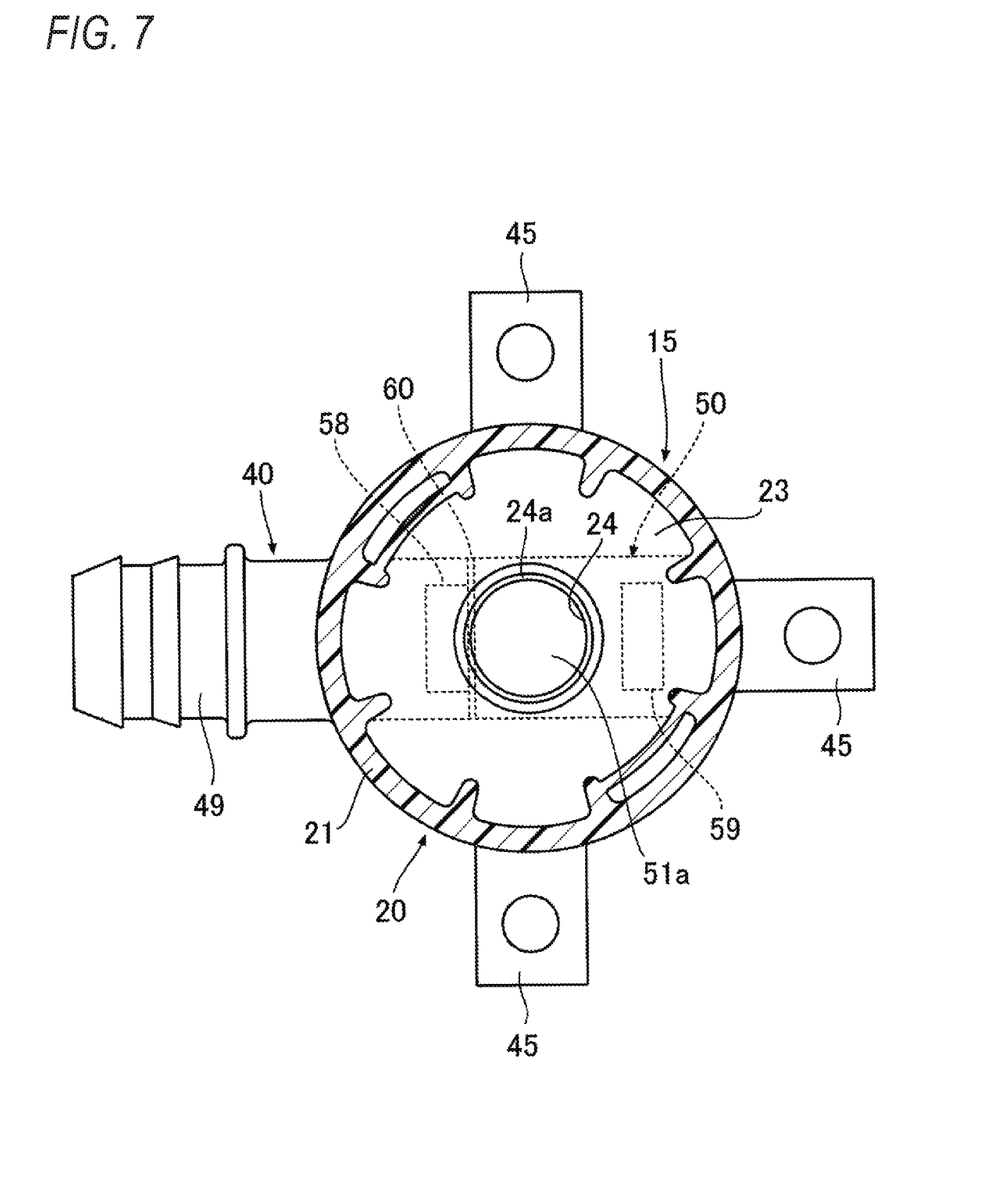
FIG. 7 is a cross-sectional view of the same valve device when viewed from a direction along an axial direction of the float valve.

As shown in FIG. 4, the ventilation holes 57 of this embodiment include a first ventilation hole 58 and a second ventilation hole 59. As shown in FIG. 7, these ventilation holes 58 and 59 are configured to be displaced relative to the opening 24 provided in the partition wall 23 when the housing 15 is viewed along the axial direction of the float valve 35.

As shown in FIG. 7, a shielding portion 51a, which overlaps with the opening 24 provided in the partition wall 23 when the housing 15 is viewed along the axial direction of the float valve 35, is provided on the surface of the cylindrical wall 50 on the partition wall 23 side, here, on the outer surface of the bottom portion 51. As shown in FIG. 4, in the bottom portion 51, the first ventilation hole 58 is provided closer to the outlet 47 side than the shielding portion 51a, and the second ventilation hole 59 is provided closer to the end portion 55 side than the shielding portion 51a. The ventilation holes 57 are formed by the first ventilation hole 58 and the second ventilation hole 59 as described above.

As shown in FIGS. 3 and 7, each of the ventilation holes 58 and 59 has a substantially rectangular shape which is narrow in a direction along the extending direction of the cylindrical wall 50 and wide in a direction orthogonal to the extending direction of the cylindrical wall 50. However, each of the ventilation holes 58 and 59 may has, for example, a round hole shape, an elliptical shape, a square shape, or any other rectangular shapes, and is not particularly limited.

A regulation wall 60 which extends toward the partition wall 23 is provided on a peripheral edge of the first ventilation hole 58 on the second ventilation hole 59 side in the surface (here, the outer surface of the bottom portion 51) of the cylindrical wall 50 on the partition wall 23 side (see FIG. 4). As shown in FIG. 3, the regulating wall 60 of this embodiment extends along the width direction of the bottom portion 51 and protrudes in a length reaching the two perpendicularly extending side portions 53, 53 to form a long plate shape (see FIG. 6), and is disposed at a position substantially aligned with an outer peripheral edge portion of the opening 24 (see FIG. 4).

Although in the embodiment described above, the cross section of the bottom portion 51 constituting the cylindrical wall 50 has a substantially circular arc shape, for example, a flat surface portion 51b may be provided on the partition wall 23 side of the cylindrical wall 50, and the ventilation holes may be provided in the flat surface portion 51b, as indicated by two-dot chain lines in FIG. 6. The planar portion 51b has a planar shape substantially parallel to the partition wall 23.

Next, operation effects of the valve device 10 having the above configurations according to the present invention will be described.

As shown in FIG. 4, in a state in which fuel is not sufficiently supplied into the fuel tank, the float valve 35 is not immersed in the fuel, and the opening 24 is opened. When fuel is supplied into the fuel tank in this state, air or fuel vapor in the fuel tank sequentially passes through the valve chamber V, the opening 24, the ventilation chamber R, the ventilation holes 57 (the first ventilation hole 58 and the second ventilation hole 59), the internal space of the cylindrical wall 50, the outlet 47, and the fuel vapor pipe 49, and is discharged to the canister outside the fuel tank.

When a fuel liquid level in the fuel tank rises due to the fuel supplied into the fuel tank or turning or tilting of a vehicle, as described above, since the float valve 35 is lifted, the seal member 37 is abutted against the valve seat 24a, and the opening 24 of the partition wall 23 is closed (see FIG. 5), a discharge amount of the air or the fuel vapor in the fuel tank is reduced, further fuel supply can be prevented, while the fuel can be stopped from flowing into the ventilation chamber R through the opening 24, thus the fuel can be prevented from leaking to the outside of the fuel tank.

As shown in FIG. 6, when the vehicle is overturned or rolled over horizontally due to an accident or the like, the valve chamber V is located above, the ventilation chamber R is located below, and the fuel in the fuel tank is accumulated on a ceiling surface side of the fuel tank 1. In this case, before the seal member 37 of the float valve 35 abuts against the valve seat 24a and closes the opening 24 of the partition wall 23, the fuel flowing into the valve chamber V through the ventilation groove 21a of the housing main body 20 or the ventilation holes 30a of the cap 30 may enter the ventilation chamber R through the opening 24.

At this time, the ventilation holes 57 (here, refer to the first ventilation hole 58 and the second ventilation hole 59, the same applies hereinafter) are provided in the ventilation chamber R in the valve device 10 on the surface of the cylindrical wall 50 on the partition wall side. The cylindrical wall 50 communicates with the outlet 47 and extends from the outlet 47 toward the inside of the ventilation chamber R, and the end portion 55 of the cylindrical wall 50 is closed in the extending direction. Therefore, as described above, in a state in which the vehicle is overturned or horizontally rolled over, and the valve chamber V is located above while the ventilation chamber R is located below as shown in FIG. 6, even when the fuel flows into the ventilation chamber R from the opening 24 of the partition wall 23, the fuel is accumulated between an inner peripheral surface of the ventilation chamber R and an outer peripheral surface of the cylindrical wall 50, since it is difficult for the fuel to flow into the ventilation holes 57 formed in the bottom portion 51 of the cylindrical wall 50, the fuel can be prevented from flowing out to the fuel vapor pipe 49 through the outlet 47. Since the extending direction tip end portion of the cylindrical wall 50 is closed by the end portion 55, the fuel does not flow into the cylindrical wall 50 from this portion.

In this embodiment, as shown in FIGS. 3 and 6, since the cylindrical wall 50 includes two side portions 53, 53 extending perpendicularly in the direction away from the partition wall 23 from the two sides of the surface of the cylindrical wall 50 on the partition wall 23 side, that is, from the two sides of the bottom portion 51, even when the fuel flows into the ventilation chamber R when the vehicle is overturned or rolled over horizontally, the fuel is trapped between the inner peripheral surface of the ventilation chamber R, the two perpendicularly extending side portions 53, 53 of the cylindrical wall 50 and the end portion 55, and it is difficult for the fuel to flow into the ventilation holes 57 of the cylindrical wall 50, thus the fuel can be more effectively prevented from flowing inside the cylindrical wall 50 from the ventilation holes 57 of the bottom portion 51.

As indicated by the two-dot chain lines in FIG. 6, in a case where the flat surface portion 51b is formed on the surface of the cylindrical wall 50 on the partition wall 23 side (the outer surface of the bottom portion 51 in this case), the ventilation holes 57 can be separated as far as possible from the inner surface of the ceiling wall 41, which is a most distant surface from the partition wall 23 of the ventilation chamber R. When the fuel flows into the ventilation chamber R when the vehicle is overturned or rolled over horizontally, it can be made difficult for the fuel to flow into the cylindrical wall 50 from the ventilation holes 57 of the bottom portion 51.

In a case where the vehicle travels on a rough road and oscillates in an up-down direction or swings in a left-right direction, or suddenly turns, the opening 24 may not be closed in time by lifting the float valve 35, fuel and fuel droplets may be rapidly blew out from the opening 24 into the ventilation chamber R (see arrows in FIG. 4).

Even in such a case, in this embodiment, the first ventilation hole 58 and the second ventilation hole 59 constituting the ventilation holes 57, as shown in FIG. 7, are configured to be displaced relative to the opening 24 provided in the partition wall 23 when the housing 15 is viewed along the axial direction of the float valve 35, as described above, even when the fuel oscillates and is blown into the ventilation chamber R from the opening 24 of the partition wall 23 due to oscillation, swinging, sudden turning, or the like of the vehicle, it can be made difficult for the fuel to flow into the cylindrical wall 50 from the ventilation holes 58 and 59.

In this embodiment, as shown in FIG. 7, the shielding portion 51a, which overlaps with the opening 24 provided in the partition wall 23 when the housing 15 is viewed along the axial direction of the float valve 35, is provided on the surface of the cylindrical wall 50 on the partition wall 23 side (the outer surface of the bottom portion 51). The first ventilation hole 58 is provided closer to the outlet 47 side than the shielding portion 51a, and the second ventilation hole 59 is provided closer to the end portion 55 side than the shielding portion 51a. Therefore, even when the fuel oscillates and is blown into the ventilation chamber R from the opening 24 of the partition wall 23 as described above, the fuel is shielded by the shielding portion 51a, so it can be made difficult for the fuel to flow into the cylindrical wall 50 from the first ventilation hole 58 or the second ventilation hole 59. Even if the fuel flows into the cylindrical wall 50 from the second ventilation hole 59, the fuel can be discharged from the first ventilation hole 58, and air permeability can be secured in the cylindrical wall 50 by providing the first ventilation hole 58 and the second ventilation hole 59.

In this embodiment, as shown in FIG. 4, the regulation wall 60 which extends toward the partition wall 23 is provided on the peripheral edge of the first ventilation hole 58 on the second ventilation hole 59 side in the surface (the outer surface of the bottom portion 51) of the cylindrical wall 50 on the partition wall 23 side. Therefore, in a case when the fuel oscillates and is blown into the ventilation chamber R from the opening 24 of the partition wall 23 as described above, the fuel collides with the regulation wall 60, so the fuel can be prevented from flowing into the cylindrical wall 50 from the first ventilation hole 58. When the fuel flows into the cylindrical wall 50 from the second ventilation hole 59, the fuel can be dropped along the regulating wall 60 through the first ventilation hole 58, so that the fuel can be more easily discharged from the inside of the cylindrical wall 50.

Figure 8:
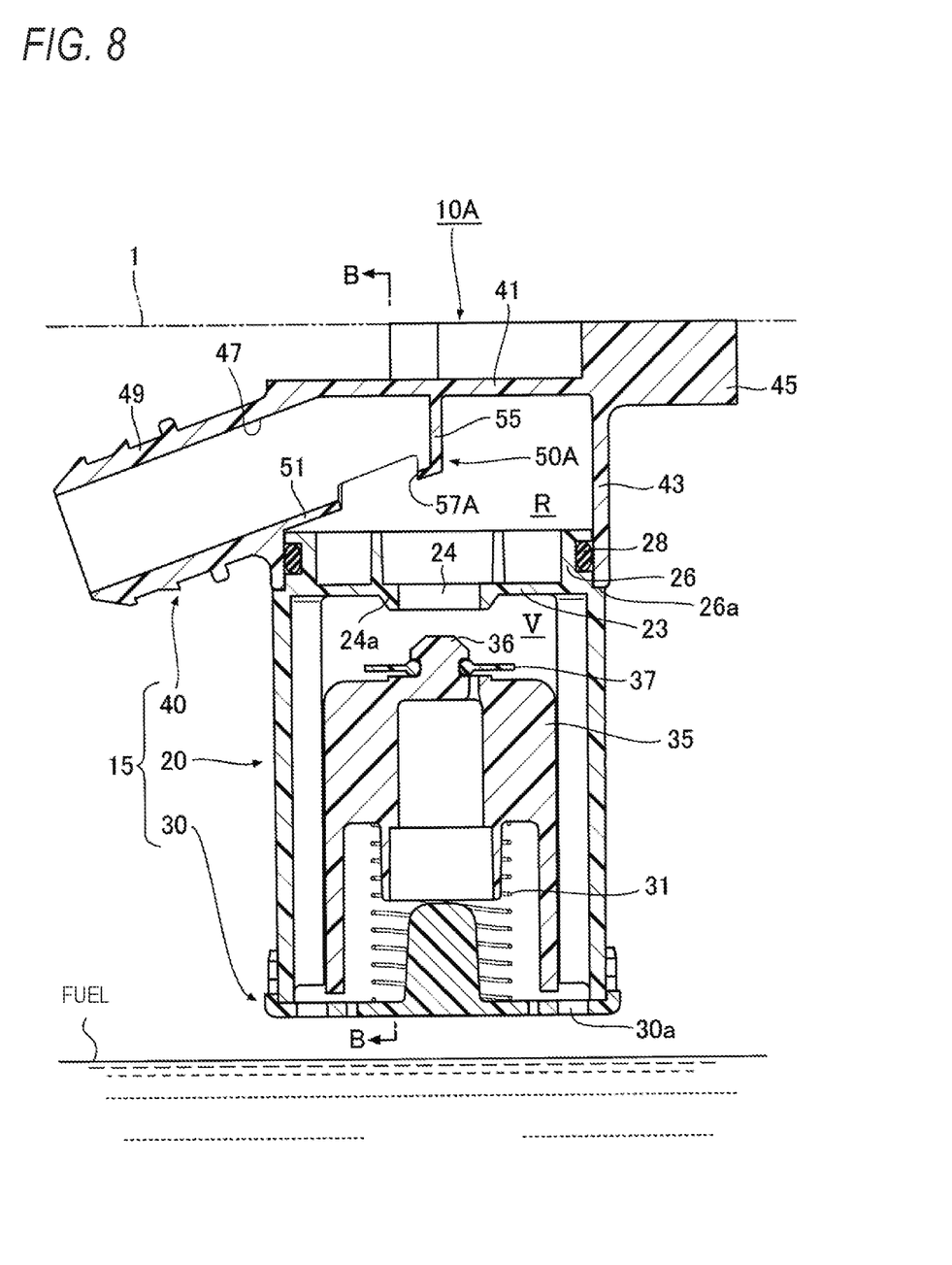
FIG. 8 is a cross-sectional view showing another embodiment of the fuel tank valve device according to the present invention.
Figure 9:
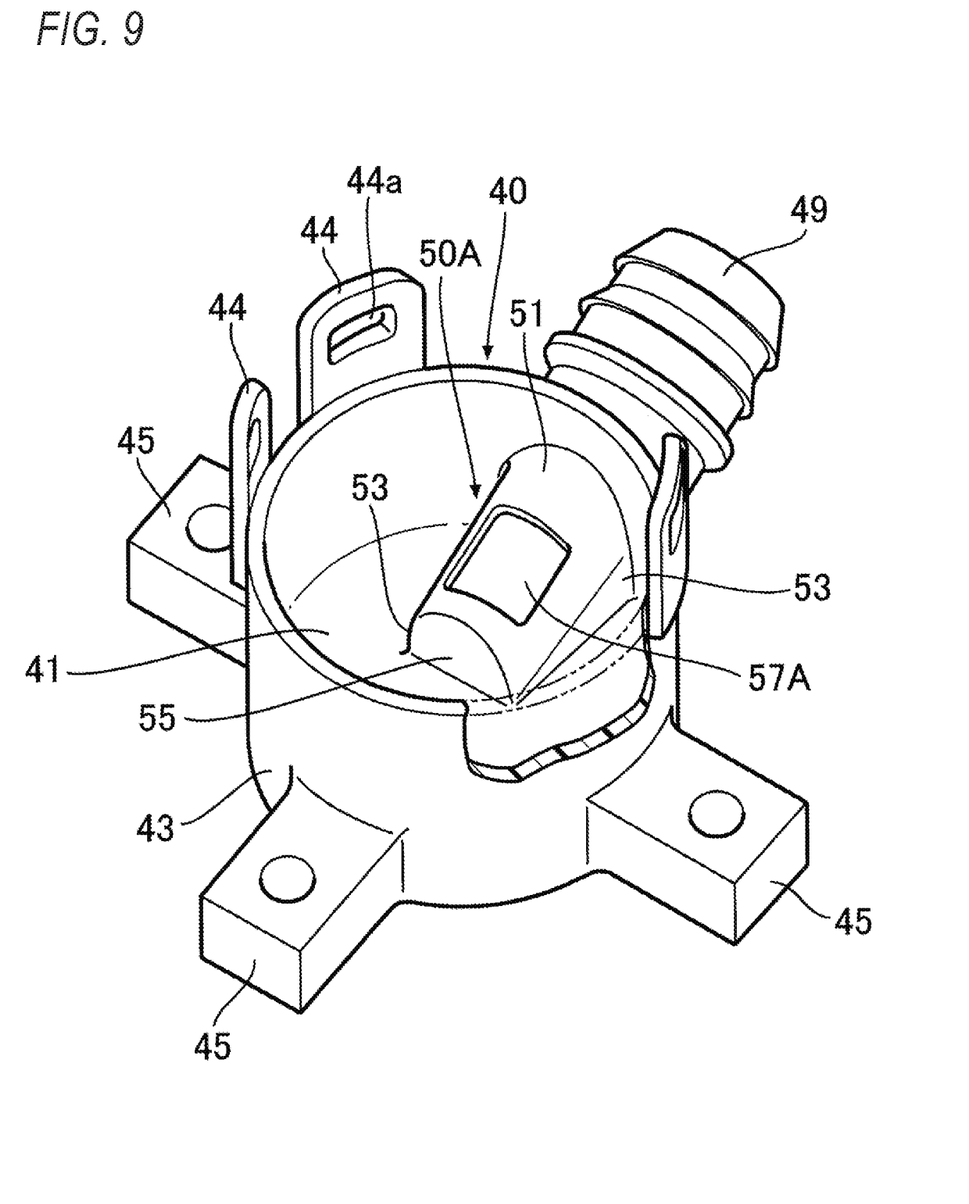
FIG. 9 is a perspective view of a cover constituting the same valve device.
Figure 10:
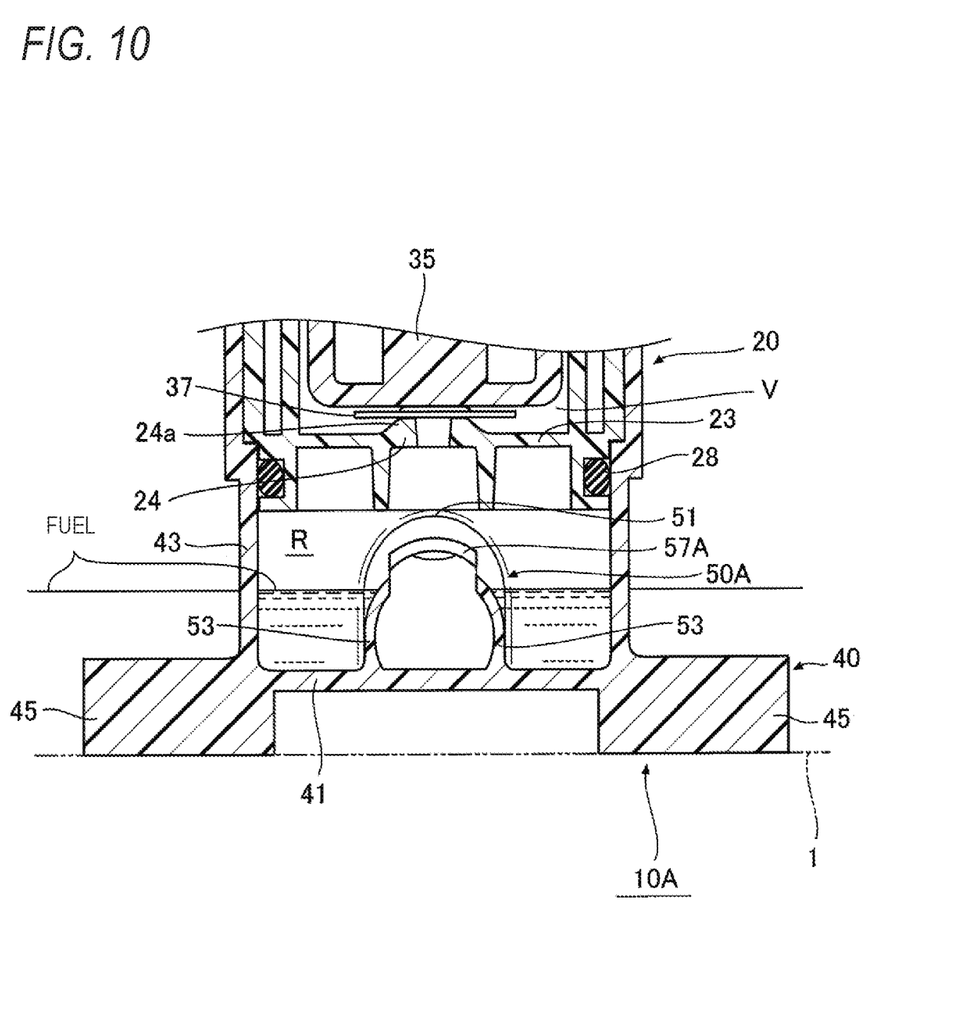
FIG. 10 is an enlarged cross-sectional view of a main part taken along Line B-B of FIG. 8 in a state in which a vehicle is overturned from the state shown in FIG. 8.

FIGS. 8 to 10 show another embodiment of the fuel tank valve device according to the present invention. The same parts as those in the above embodiment are denoted by the same reference numerals, and description thereof will be omitted.

A fuel tank valve device 10A (hereinafter, referred to as the "valve device 10A") of this embodiment is mainly different from the above embodiment in a structure of a cylindrical wall 50A.

That is, as shown in FIG. 8, the fuel vapor pipe 49 extends obliquely downward from the outer peripheral edge of the outlet 47 formed in the peripheral wall 43 of the cover 40 so as to be separated from the ceiling wall 41. As shown in FIGS. 8 and 9, the cylindrical wall 50A extending from the inner peripheral edge of the outlet 47 toward the inside of the ventilation chamber R extends obliquely upward so as to be close to the ceiling wall 41 along an extending direction of the fuel vapor pipe 49. As shown in FIG. 8, the cylindrical wall 50A is disposed at a position where the end portion 55 of the cylindrical wall 50A is aligned substantially with a center of the opening 24 of the partition wall 23.

A ventilation hole 57A in this embodiment has a substantially square shape which has an opening area larger than opening areas of the first ventilation hole 58 and the second ventilation hole 59 of the above embodiment, and is provided at a position close to the end 55 of the bottom portion 51 of the cylindrical wall 50A. The opening area of the ventilation hole 57A is substantially the same as a total opening area of the first ventilation hole 58 and the second ventilation hole 59 of the above embodiment.

In this embodiment, as described above, in a state in which the valve chamber V is located above while the ventilation chamber R is located below due to overturn or the like of the vehicle, as shown in FIG. 10, when the fuel flows into the ventilation chamber R from the opening 24 of the partition wall 23, the fuel is accumulated between the inner peripheral surface of the ventilation chamber R and an outer peripheral surface of the cylindrical wall 50A, since it is difficult for the fuel to flow into the ventilation hole 57A, the fuel can be prevented from flowing out to the fuel vapor pipe 49 through the outlet 47.

The present invention is not limited to the embodiments described above, and various modified embodiments are possible within the scope of the present invention, and such embodiments are also included in the scope of the present invention.

REFERENCE SIGNS LIST 10, 10A Fuel Tank Valve Devices (Valve Devices)
15 Housing

20 Housing Main Body
23 Partition Wall
24 Opening
28 Seal Ring
30 Cap
31 Spring
35 Float Valve
37 Seal Member
40 Cover
47 Outlet
49 Fuel Vapor Pipe
50, 50A Cylindrical Walls
51 Bottom Portion
51a Shielding Portion
51b Flat Surface Portion
53, 53 Two Side Portions
55 End Portion
57, 57A Ventilation Holes
58 First Ventilation Hole
59 Second Ventilation Hole
60 Regulation Wall
R Ventilation Chamber
V Valve Chamber

The invention claimed is:

1. A fuel tank valve device, comprising:
a housing, in which a partition wall is provided to partition a valve chamber below and a ventilation chamber above, the partition wall being provided with an opening therein to communicate the valve chamber with the ventilation chamber, and an outlet is formed in a peripheral surface of the housing on a ventilation chamber side;
a float valve, which is configured to be lifted and lowered in the valve chamber to become abutted against and separated from the opening; and
a fuel vapor pipe, which is connected to the outlet outside the housing,
wherein a cylindrical wall is provided in the ventilation chamber, the cylindrical wall communicating with the outlet and extending in an extending direction from the outlet toward an inner side of the ventilation chamber,
wherein the cylindrical wall circumferentially extends about an axis of the fuel vapor pipe,
wherein at least one ventilation hole is provided in a surface of the cylindrical wall on a partition wall side to communicate with the ventilation chamber, and an end portion of the cylindrical wall on a side away from the outlet in the extending direction is closed, and
wherein a shielding portion, which is overlapped with the opening when the housing is viewed along the axial direction of the float valve, is provided on the surface of the cylindrical wall on the partition wall side, the at least one ventilation hole includes a first ventilation hole and a second ventilation hole, the first ventilation hole is provided so as to be closer to an outlet side than the shielding portion, and the second ventilation hole is provided so as to be closer to an end portion side of the cylindrical wall than the shielding portion.

2. The fuel tank valve device according to claim 1, wherein one of the first ventilation hole and the second ventilation hole is provided so as to be displaced relative to the opening when the housing is viewed along the axial direction of the float valve.

3. The fuel tank valve device according to claim 1, wherein
the surface of the cylindrical wall on the partition wall side includes a flat surface portion, and one of the first ventilation hole and the second ventilation hole is provided in the flat surface portion.

4. The fuel tank valve device according to claim 1, wherein the extending direction is orthogonal to an axial direction of the float valve, and the axis of the fuel vapor pipe is orthogonal to the axial direction of the float valve.

5. The fuel tank valve device according to claim 1, wherein both of the first ventilation hole and the second ventilation hole are provided so as to be displaced relative to the opening when the housing is viewed along the axial direction of the float valve.

6. The fuel tank valve device according to claim 1, wherein the surface of the cylindrical wall on the partition wall side includes a flat surface portion, and both of the first ventilation hole and the second ventilation hole are provided in the flat surface portion.

7. A fuel tank valve device, comprising:
a housing, in which a partition wall is provided to partition a valve chamber below and a ventilation chamber above, the partition wall being Provided with an opening therein to communicate the valve chamber with the ventilation chamber, and an outlet is formed in a peripheral surface of the housing on a ventilation chamber side;
a float valve, which is configured to be lifted and lowered in the valve chamber to become abutted against and separated from the opening; and
a fuel vapor pipe, which is connected to the outlet outside the housing,
wherein a cylindrical wall is provided in the ventilation chamber, the cylindrical wall communicating with the outlet and extending in an extending direction from the outlet toward an inner side of the ventilation chamber,
wherein at least one ventilation hole is provided in a surface of the cylindrical wall on a partition wall side to communicate with the ventilation chamber, and an end portion of the cylindrical wall on an extending direction side is closed,
wherein a shielding portion which is overlapped with the opening when the housing is viewed along the axial direction of the float valve is provided on the surface of the cylindrical wall on the partition wall side, the at least one ventilation hole includes a first ventilation hole and a second, ventilation hole, the first ventilation hole is provided so as to be closer to the outlet side than the shielding portion, and the second ventilation hole is provided so as to be closer to an end portion side of the cylindrical wall than the shielding portion, and
wherein a regulation wall which extends toward the partition wall is provided on a peripheral edge of the first ventilation hole on the second ventilation hole side in the surface of the cylindrical wall on the partition wall side.

8. A fuel tank valve device comprising:
a housing, in which a partition wall is provided to partition a valve chamber below and a ventilation chamber above, the partition wall being Provided with an opening therein to communicate the valve chamber with the ventilation chamber, and an outlet is formed in a peripheral surface of the housing on a ventilation chamber side;
a float valve, which is configured to be lifted and lowered in the valve chamber to become abutted against and separated from the opening; and
a fuel vapor pipe, which is connected to the outlet outside the housing, wherein a cylindrical wall is provided in the ventilation chamber, the cylindrical wall communicating with the outlet and extending in an extending direction from the outlet toward an inner side of the ventilation chamber, wherein at least one ventilation hole is provided in a surface of the cylindrical wall on a partition wall side to communicate with the ventilation chamber, and an end portion of the cylindrical wall on an extending direction side is closed, wherein a shielding portion which is overlapped with the opening when the housing is viewed along the axial direction of the float valve is provided on the surface of the cylindrical wall on the partition wall side, the at least one ventilation hole includes a first ventilation hole and a second, ventilation hole, the first ventilation hole is provided so as to be closer to the outlet side than the shielding portion, and the second ventilation hole is provided so as to be closer to an end portion side of the cylindrical wall than the shielding portion, and wherein the cylindrical wall includes two side portions extending perpendicularly from two sides of the surface on the partition wall side in a direction away from the partition wall.

* * * * *